United States Patent
Katt

[11] 3,912,405
[45] Oct. 14, 1975

[54] FRANGIBLE POST COUPLING

[76] Inventor: Herbert L. Katt, 4107 Pennington Lane, Racine, Wis. 53403

[22] Filed: Jan. 2, 1975

[21] Appl. No.: 537,966

[52] U.S. Cl. .......................... 403/2; 403/11; 403/292
[51] Int. Cl.² ............................................ F16B 7/00
[58] Field of Search ......... 403/2, 11, 312, 292, 123, 403/286; 285/2, 3, 4; 52/98, 99, 100, 232, 296; 404/10; 248/160; 40/125 N, 145 R, 145 A

[56] References Cited
UNITED STATES PATENTS

| | | | |
|---|---|---|---|
| 2,945,659 | 7/1960 | McDonald | 52/98 X |
| 3,349,531 | 10/1967 | Watson | 403/2 X |
| 3,439,947 | 4/1969 | Luckinbill et al. | 403/2 |

*Primary Examiner*—Andrew V. Kundrat
*Attorney, Agent, or Firm*—Andrus, Sceales, Starke & Sawall

[57] ABSTRACT

A frangible tubular coupling loosely fits within adjacent ends of the post and its support members and is secured in place by cross bolts which also carry a connecting link having a lost motion slot receiving the bolt of at least one member.

3 Claims, 4 Drawing Figures

U.S. Patent    Oct. 14, 1975    3,912,405
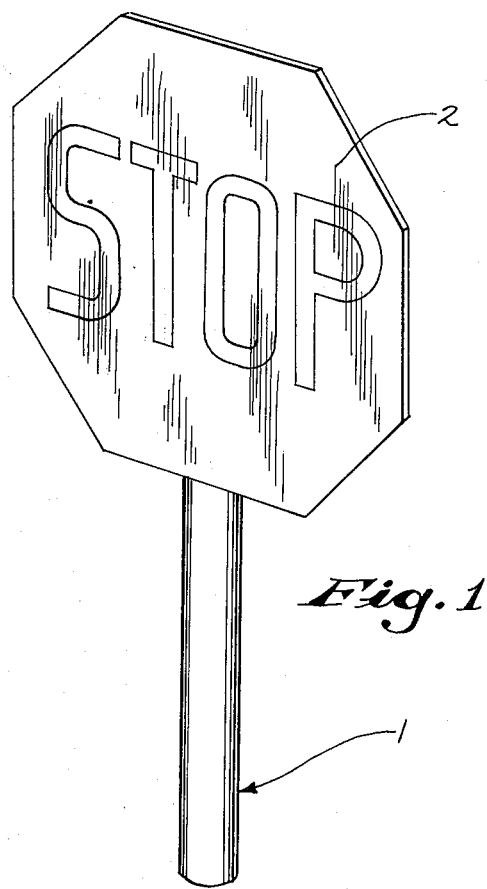
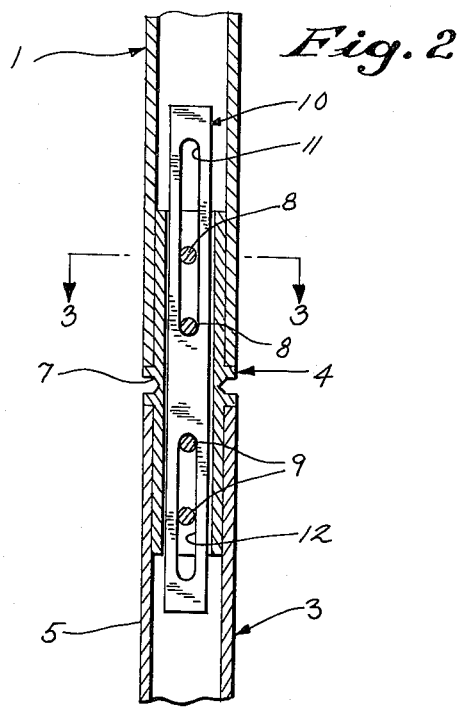
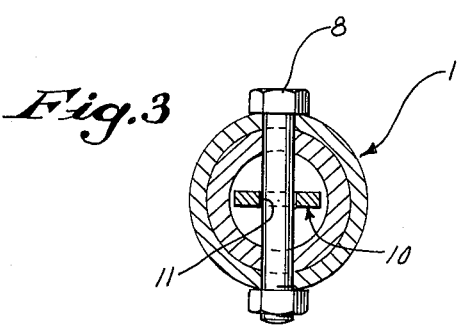
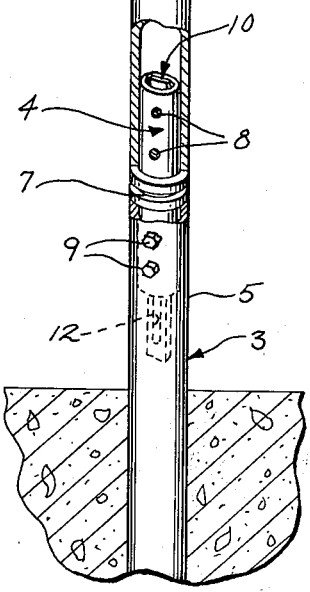
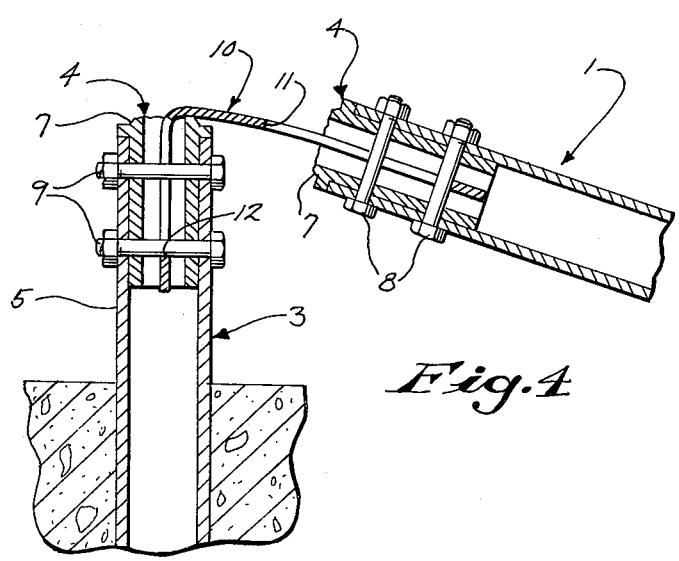

FRANGIBLE POST COUPLING

CROSS REFERENCE TO RELATED APPLICATION

Reference is made to application Ser. No. 537,965 filed Jan. 2, 1975 by the present applicant and which discloses the connecting link in a somewhat different setting than herein claimed, said application being co-pending herewith.

BACKGROUND OF THE INVENTION

This invention relates to a frangible post coupling for mounting a tubular post upon a tubular base of corresponding size and providing a predetermined frangible region between the post and the base whereby a sharp lateral impact upon the post will break the coupling and generally avoid damage to the post and to the base.

In the past various constructions have been proposed for this purpose, including for instance the construction illustrated in the above referred to copending application.

The problem which the present invention is directed to lies in the application of the principles of the above copending application to posts of generally cylindrical tubular construction without having a cost that is prohibitive in the commercial market.

In this regard reference may be made to U.S. Pat. No. 3,349,531 which discloses a frangible connector assembly for a tubular post. The construction illustrated depends upon a drive fit of the connector within the post and base to secure the post in place. Furthermore, the construction is expensive in requiring a cross member or head on either end of the connector to carry a bendable coupling member which is generally difficult to assemble and install. Furthermore, the bendable coupling member merely ties the two ends of the connector together and any tying of the post to the base depends entirely upon the drive fit of the connector.

SUMMARY OF THE INVENTION

The present invention provides a very low cost assembly in which a cylindrical tubular coupling fits loosely within the lower end of the post and adjacent upper end of the base and cross bolts secure the coupling to each of the ends.

A connector strip is employed carried by the bolts with a lost motion slot to provide for a limited movement of the post following impact.

BRIEF DESCRIPTION OF THE DRAWING

The best mode presently contemplated for carrying out the invention as illustrated in the accompanying drawings in which:

FIG. 1 is a perspective view of a highway sign post and its base support with parts broken away and sectioned to show the frangible coupling;

FIG. 2 is a vertical section through the coupling and adjacent parts of the post and base;

FIG. 3 is a transverse section taken on line 3—3 of FIG. 2; and

FIG. 4 is an elevational view taken at right angles to the section of FIG. 2 and with parts broken away and sectioned, showing the post tied to the base following impact and breaking of the coupling.

DESCRIPTION OF THE PREFERRED EMBODIMENT

The post illustrated in the drawing comprises an upright tubular cylindrical post section 1 having a road sign 2 secured to the upper end thereof, and supported at its lower end upon a base 3 by means of a coupling 4.

The base 3 comprises a tubular cylindrical section 5 generally of the same diameter and wall thickness as post section 1 and a lower end or member which may extend down into the ground or concrete to support the same upright for alignment with post section 1.

The coupling 4 comprises a tubular cylindrical member fitting closely within the lower end of post section 1 and the upper end section 5 of base 3, and having an external circumferential groove 7 centrally thereof between the generally spaced ends of the post and base to designate a weakened area or region for selective breakage upon stressing as by a lateral impact upon the upper post section from a high speed vehicle.

Bolts 8 extend through the post section 1 and upper end portion 5 of coupling 3 above groove 7.

Bolts 9 extend through the upright end 5 of base 3 and the lower end portion of coupling 4 below groove 7.

Bolts 8 and 9 serve to secure the assembly together with the post section 1 generally rigidly supported upon base 3 with the adjacent end edges of section 1 and section 5 spaced at groove 7.

A link 10 is carried by bolts 8 and 9 to tie the section 1 to base 3 upon fracture of coupling 4 at groove 7.

Limited movement of post section 1 following impact by a vehicle, is provided by a lost motion construction in which longitudinal slots 11 and 12 in the metal strip constituting link 10 receive the bolts 8 and 9, respectively.

When the parts are first assembled and before any impact the upper slot 11 extends from the lower bolt 8 to a predetermined distance above the upper bolt 8, and the lower slot 12 extends from the upper bolt 9 to a predetermined distance below the lower bolt 9.

Upon impact and fracture of coupling 4 at groove 7 the upper post section 1 can move away from base 3 a distance corresponding to the lost motion provided by slots 11 and 12, i.e. until upper bolt 8 reaches the upper end of slot 11 and lower bolt 9 reaches the lower end of slot 12.

Thereupon, post section 1 will remain tied to base 3 and will not fly free by reason of forces transmitted to it by the impact. Instead the post section 1 will tilt downwardly to lie on the ground, and the car can ride over it without being damaged, as illustrated in part in FIG. 4.

For this purpose it is preferable to dispose the bolts 8 and 9 in a direction generally parallel to the expected direction of impact upon the post so that the strip or link 10 is subject to possible bending forces and avoids injury to the end of either the upper post section 1 or the lower section 5 of base 3.

Various modes of carrying out the invention are contemplated as being within the scope of the following claims particularly pointing out and distinctly claiming the subject matter which is regarded as the invention.

I claim:

1. A post having a frangible coupling, comprising a substantially cylindrical tubular upper post section disposed upright upon a base having a correspondingly upright tubular lower section in alignment therewith, and a frangible coupling joining said post sections, said frangible coupling comprising a cylindrical tubular member telescoped by said post sections from opposite ends of said member, transverse bolts extending through each post section and the corresponding telescoped end of said member to support the assembly upon said base, a frangible circumferential zone centrally of said member to provide for breakage of the member upon lateral impact against said upper post section, and a tie link carried by said bolts and having a lost motion connection therewith to limit the movement of said upper post section after severance of said member at said frangible zone.

2. The construction of claim 1 in which said tie link comprises a strip of metal with said bolts passing freely therethrough and having a lost motion slot therein for the bolts of at least one post section.

3. The construction of claim 2 installed adjacent a highway with said bolts extending generally parallel to the line of traffic.

* * * * *